United States Patent
Kumar (10) Patent No.: US 7,921,153 B2
(45) Date of Patent: Apr. 5, 2011

(54) METHODS AND APPARATUSES FOR SELECTIVELY DISPLAYING INFORMATION TO AN INVITED PARTICIPANT

(75) Inventor: Manish Kumar, Sunnyvale, CA (US)

(73) Assignee: WebEx Communications, Inc., Santa Clara, CA (US)

( * ) Notice: Subject to any disclaimer, the term of this patent is extended or adjusted under 35 U.S.C. 154(b) by 861 days.

(21) Appl. No.: 11/323,601

(22) Filed: Dec. 29, 2005

(65) Prior Publication Data
US 2007/0156810 A1 Jul. 5, 2007

(51) Int. Cl.
*G06F 15/16* (2006.01)
(52) U.S. Cl. .................................................. 709/203
(58) Field of Classification Search ............. 709/205, 709/218, 203; 713/200; 715/230
See application file for complete search history.

(56) References Cited

U.S. PATENT DOCUMENTS

| | | | |
|---|---|---|---|
| 6,442,577 B1 * | 8/2002 | Britton et al. ............... | 715/230 |
| 2002/0002586 A1 * | 1/2002 | Rafal et al. .................. | 709/205 |
| 2004/0199605 A1 * | 10/2004 | LaCroix et al. .............. | 709/218 |
| 2005/0033615 A1 * | 2/2005 | Nguyen et al. ............... | 705/5 |
| 2005/0060565 A1 * | 3/2005 | Chebolu et al. .............. | 713/200 |
| 2007/0004389 A1 * | 1/2007 | Wallace et al. .............. | 455/415 |

FOREIGN PATENT DOCUMENTS

| WO | WO 9926153 A2 * | 5/1999 |
|---|---|---|
| WO | WO-03/094436 A2 * | 11/2003 |

OTHER PUBLICATIONS

Construction Web User Profiles: A Non-invasive Learning Approach, Philip K. Chan Computer Science, Florida Institute of Technology Melbourne, FL 32901 pkc@cs.fit.edu http://www.cs.fit.edu/~pkc/.*

* cited by examiner

*Primary Examiner* — Nathan Flynn
*Assistant Examiner* — Najeeb Ansari
(74) *Attorney, Agent, or Firm* — Cesari and McKenna, LLP (57) ABSTRACT

In one embodiment, methods and apparatuses are provided for allowing an invited participant to access a customized web page; programming a first content for the invited participant; displaying the first content on the customized web page to the invited participant; and automatically displaying a second content to the invited participant based on displaying the first content to the invited participant.

20 Claims, 7 Drawing Sheets

METHODS AND APPARATUSES FOR SELECTIVELY DISPLAYING INFORMATION TO AN INVITED PARTICIPANT

FIELD OF INVENTION

The present invention relates generally to displaying information to a participant and, more particularly, to selectively displaying information to an invited participant.

BACKGROUND

There has been an increased use in web pages to communicate information to employees, vendors, and clients. Through these web pages, information is presented to multiple participants. This presented information may include audio, graphical, and/or textual information.

SUMMARY

In one embodiment, the methods and apparatuses include allowing an invited participant to access a customized web page; programming a first content for the invited participant; displaying the first content on the customized web page to the invited participant; and automatically displaying a second content to the invited participant based on displaying the first content to the invited participant.

BRIEF DESCRIPTION OF THE DRAWINGS

The accompanying drawings, which are incorporated in and constitute a part of this specification, illustrate and explain one embodiment of the methods and apparatuses for selectively displaying information to an invited participant. In the drawings.

DETAILED DESCRIPTION

The following detailed description of the methods and apparatuses for selectively displaying information to an invited participant refers to the accompanying drawings. The detailed description is not intended to limit the methods and apparatuses for selectively displaying information to an invited participant. Instead, the scope of the methods and apparatuses for selectively displaying information to an invited participant is defined by the appended claims and equivalents. Those skilled in the art will recognize that many other implementations are possible, consistent with the present invention.

References to a device include a device utilized by a user such as a desktop computer, a portable computer, a personal digital assistant, a video phone, a landline telephone, a cellular telephone, and a device capable of receiving/transmitting an electronic signal.

References to content include audio, video, graphical, and/or textual data.

References to a window are directed to an area utilized to display the content.

References to a desktop are directed to an entire portion of a display area of a corresponding device.

References to a participant device include devices that are participating in the collaboration session.

References to a presenter device include a device that is a participant and shares content with other participants.

References to an attendee device include a device that is a participant and receives content shared by another participant device. The attendees are capable of viewing content that is offered by the presenter device. In some instances, the attendee devices are capable of modifying the content shared by the presenter device.

In one embodiment, the methods and apparatuses for selectively sharing a portion of a display during a collaboration session allow a presenter device to share desktop content associated with the presenter device to an attendee device while preventing the attendee device from gaining access to private content shown within a particular window that is shown to the presenter device within the desktop content. In one embodiment, the private content shown within the particular window is part of the desktop content associated with the presenter device. Further, the attendee device is capable of viewing the desktop content associated with the presenter device while excluding the private content shown within the particular window.

Figure 1:
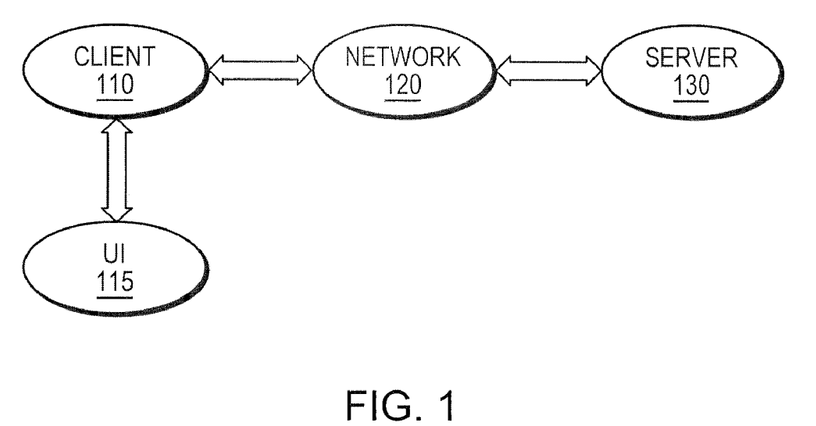
FIG. 1 is a diagram illustrating an environment within which the methods and apparatuses for selectively displaying information to an invited participant are implemented.

FIG. 1 is a diagram illustrating an environment within which the methods and apparatuses for selectively displaying information to an invited participant are implemented. The environment includes an electronic device 110 (e.g., a computing platform configured to act as a client device, such as a computer, a personal digital assistant, and the like), a user interface 115, a network 120 (e.g., a local area network, a home network, the Internet), and a server 130 (e.g., a computing platform configured to act as a server).

In one embodiment, one or more user interface 115 components are made integral with the electronic device 110 (e.g., keypad and video display screen input and output interfaces in the same housing such as a personal digital assistant. In other embodiments, one or more user interface 115 components (e.g., a keyboard, a pointing device such as a mouse, a trackball, etc.), a microphone, a speaker, a display, a camera are physically separate from, and are conventionally coupled to, electronic device 110. In one embodiment, the user utilizes interface 115 to access and control content and applications stored in electronic device 110, server 130, or a remote storage device (not shown) coupled via network 120.

In accordance with the invention, embodiments of selectively displaying information to an invited participant below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

Figure 2:
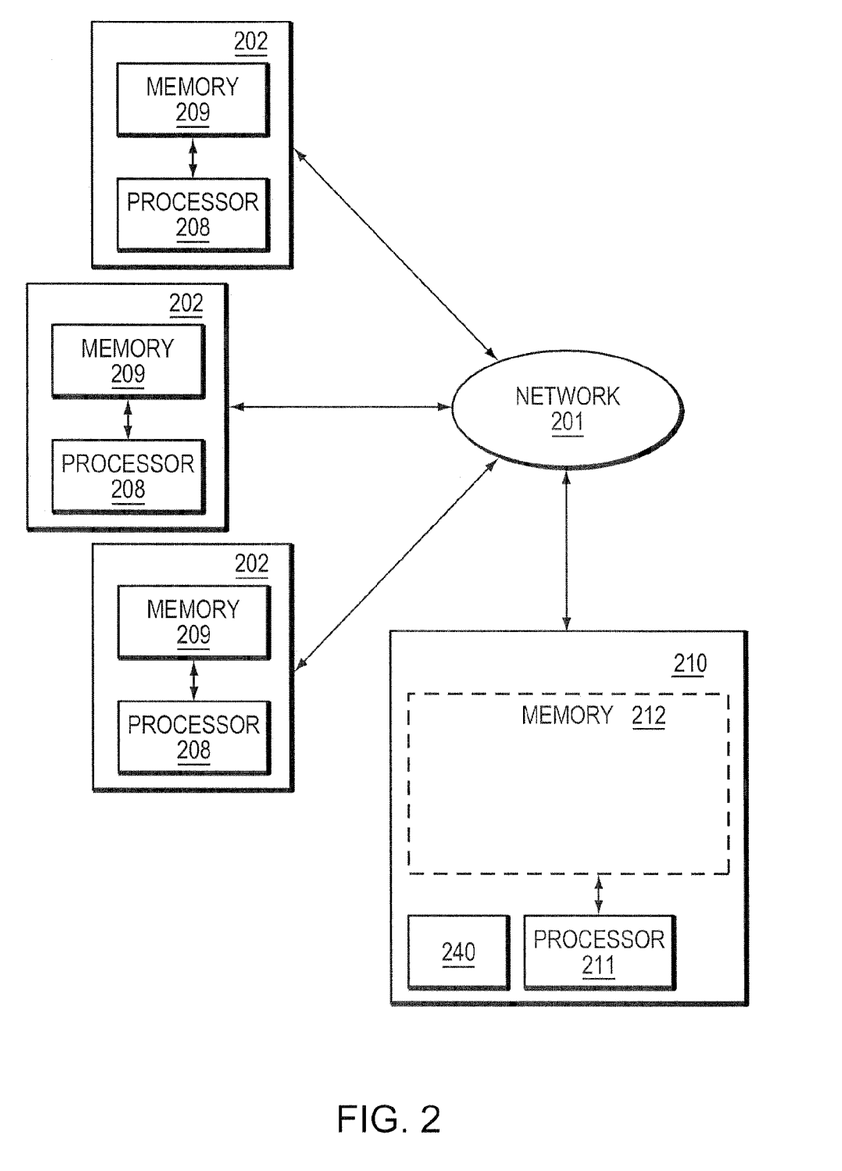
FIG. 2 is a simplified block diagram illustrating one embodiment in which the methods and apparatuses for selectively displaying information to an invited participant are implemented.

FIG. 2 is a simplified diagram illustrating an exemplary architecture in which the methods and apparatuses for selectively displaying information to an invited participant are implemented. The exemplary architecture includes a plurality of electronic devices 202, a server device 210, and a network 201 connecting electronic devices 202 to server 210 and each electronic device 202 to each other. The plurality of electronic devices 202 are each configured to include a computer-readable medium 209, such as random access memory, coupled to an electronic processor 208. Processor 208 executes program instructions stored in the computer-readable medium 209. In one embodiment, a unique user operates each electronic device 202 via an interface 115 as described with reference to FIG. 1.

The server device 130 includes a processor 211 coupled to a computer-readable medium 212. In one embodiment, the server device 130 is coupled to one or more additional external or internal devices, such as, without limitation, a secondary data storage element, such as database 240.

In one instance, processors 208 and 211 are manufactured by Intel Corporation, of Santa Clara, Calif. In other instances, other microprocessors are used.

In one embodiment, the plurality of client devices 202 and the server 210 include instructions for a customized application for selectively displaying information to an invited participant. In one embodiment, the plurality of computer-readable media 209 and 212 contain, in part, the customized application. Additionally, the plurality of client devices 202 and the server 210 are configured to receive and transmit electronic messages for use with the customized application. Similarly, the network 210 is configured to transmit electronic messages for use with the customized application.

One or more user applications are stored in media 209, in media 212, or a single user application is stored in part in one media 209 and in part in media 212. In one instance, a stored user application, regardless of storage location, is made customizable based on selectively displaying information to an invited participant as determined using embodiments described below.

Figure 3:
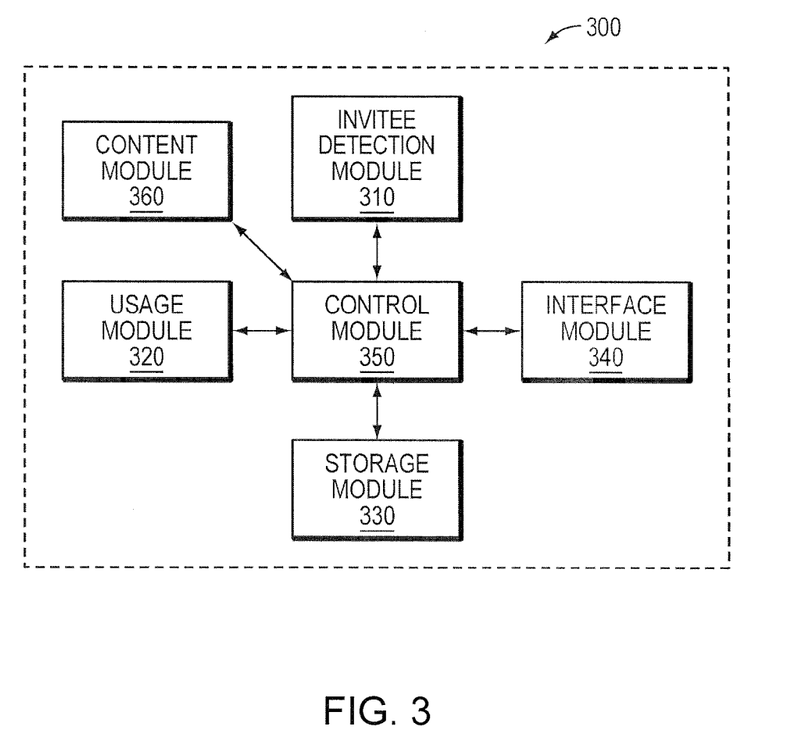
FIG. 3 is a simplified block diagram illustrating a system, consistent with one embodiment of the methods and apparatuses for selectively displaying information to an invited participant.

FIG. 3 illustrates one embodiment of a system 300. In one embodiment, the system 300 is embodied within the server 130. In another embodiment, the system 300 is embodied within the electronic device 110. In yet another embodiment, the system 300 is embodied within both the electronic device 110 and the server 130.

In one embodiment, the system 300 includes an invitee detection module 310, a usage module 320, a storage module 330, an interface module 340, a control module 350, and a content module 360.

In one embodiment, the control module 350 communicates with the invitee detection module 310, the usage module 320, the storage module 330, the interface module 340, and the content module 360. In one embodiment, the control module 350 coordinates tasks, requests, and communications between the invitee detection module 310, the usage module 320, the storage module 330, the interface module 340, and the content module 360.

In one embodiment, the invitee detection module 310 detects a participant that is an invitee to a customized web page. In one embodiment, each participant logs into the customized web page prior to gaining access to this web page and is detected by the invitee detection module 310. In another embodiment, the participant is recognized without logging onto the customized web page and is recognized by the invitee detection module 310.

In one embodiment, the usage module 320 monitors usage by the invited participant of the customized web page. In one embodiment, the usage module 320 is capable of detecting the specific content accessed by the participant.

In one embodiment, the interface detection module 340 detects input from the participant accessing the customized web page. In another embodiment, the interface detection module 340 monitors the content provided by a host of the customized web page.

In one embodiment, the storage module 330 stores a record including a profile associated with each participant that accesses the customized web page. An exemplary profile is shown in a record 400 within FIG. 4.

In one embodiment, the interface module 340 receives a signal from one of the electronic devices 110. In one embodiment, the electronic devices 110 are participating in a collaboration session. In another embodiment, the interface module 340 delivers a signal to one of the electronic devices 110.

In one embodiment, the content module 360 delivers content to the customized web page for use by the participants. In one embodiment, the host selects the appropriate content for display on the customized web page.

The system 300 in FIG. 3 is shown for exemplary purposes and is merely one embodiment of the methods and apparatuses for selectively displaying information to an invited participant. Additional modules may be added to the system 300 without departing from the scope of the methods and apparatuses for selectively displaying information to an invited participant. Similarly, modules may be combined or deleted without departing from the scope of the methods and apparatuses for selectively displaying information to an invited participant.

Figure 4:
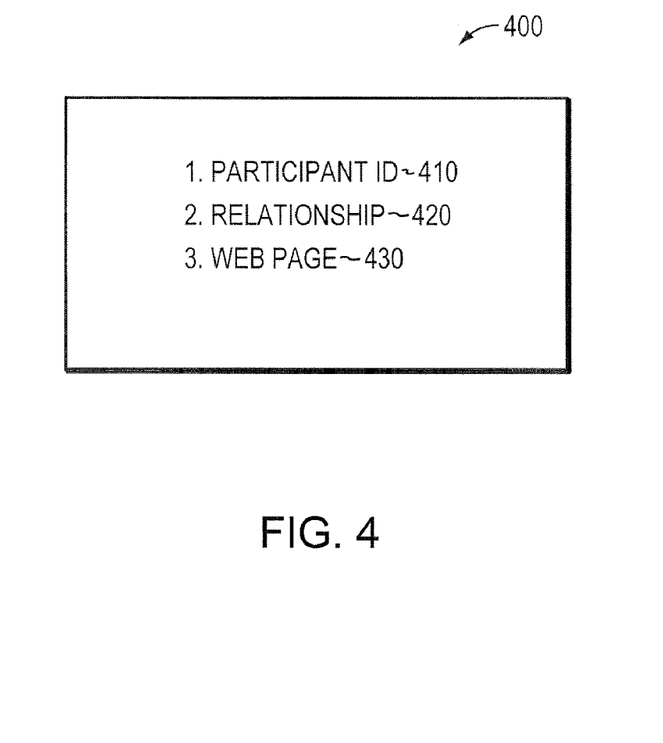
FIG. 4 is an exemplary record for use with the methods and apparatuses for selectively displaying information to an invited participant.

FIG. 4 illustrates an exemplary record 400 for use with the methods and apparatuses for selectively displaying information to an invited participant. In one embodiment, the record 400 illustrates an exemplary record associated with the profile information of a particular participant while viewing the customized web page.

In one embodiment, there are multiple records such that each record 400 is associated with a particular participant. Further, each participant corresponds with multiple records wherein each record 400 for a particular participant corresponds to a particular customized web page.

In one embodiment, the record 400 includes a participant identity field 410, a relationship field 420, and a web page field 430. In one embodiment, the record 400 resides within the storage module 330. In one embodiment, the record 400 describes attributes detected through the system 300.

In one embodiment, the participant identity field 410 includes information related to the unique identity of the participant. In one embodiment, a unique name of the user of the participant is utilized within the participant identity field 410. In another embodiment, a unique number identifier is utilized within the participant identity field 410.

In one embodiment, the participant identified within the participant identity field 410 also has access to the customized web page. Further, the participant identity field 410 also identifies a host for the customized web page.

In one embodiment, the relationship field 420 includes a reference to another participant that is related to the current participant associated with the profile 400. For example, the relationship field 420 may identify another participant as an invitee of the current participant, a co-worker of the current participant, a supervisor of the current participant, and the like. In one embodiment, the participant identified within the relationship field 420 also has access to the customized web page.

In one embodiment, the web page field 430 identifies a customized web page that is associated with the record 400.

Figure 5:
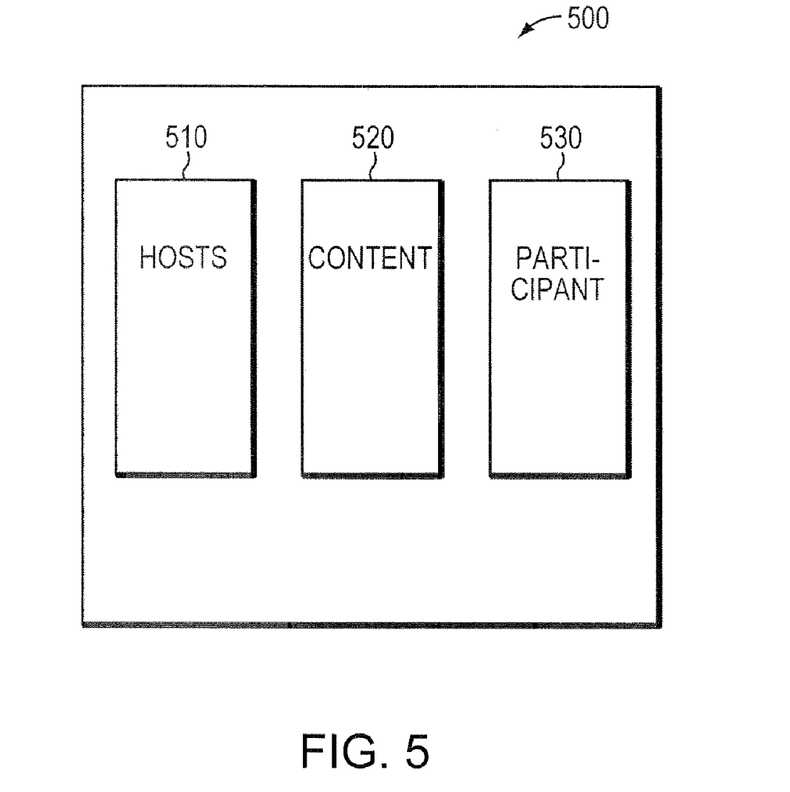
FIG. 5 is a flow diagram consistent with one embodiment of the methods and apparatuses for selectively displaying information to an invited participant.

FIG. 5 illustrates a sample customized web page 500 for use with the system 300. In one embodiment, the customized web page 500 includes a host section 510, a content section 520, and an invitee section 530.

In one embodiment, the host section 510 includes contact information corresponding to the host of the customized web page 500. In one embodiment, the contact information includes a name, a phone number, and an email address. In one embodiment, there are multiple hosts listed in the host section 510.

In one embodiment, the content section 520 is configured to display content to the invitees of the customized web page 500. In one embodiment, the hosts of the customized web page 500 select the content displayed within the content section 520. In one embodiment, the content includes textual data, graphical data, and/or audio data.

In one embodiment, the invitee section 530 includes contact information corresponding to the invitees of the customized web page 500. In one embodiment, the contact information includes a name, a phone number, and an email address. Further, the presence status of the particular invitee is also shown in one embodiment. In one embodiment, the invitee section 530 is visible only the hosts of the customized web page 500.

Figure 6:
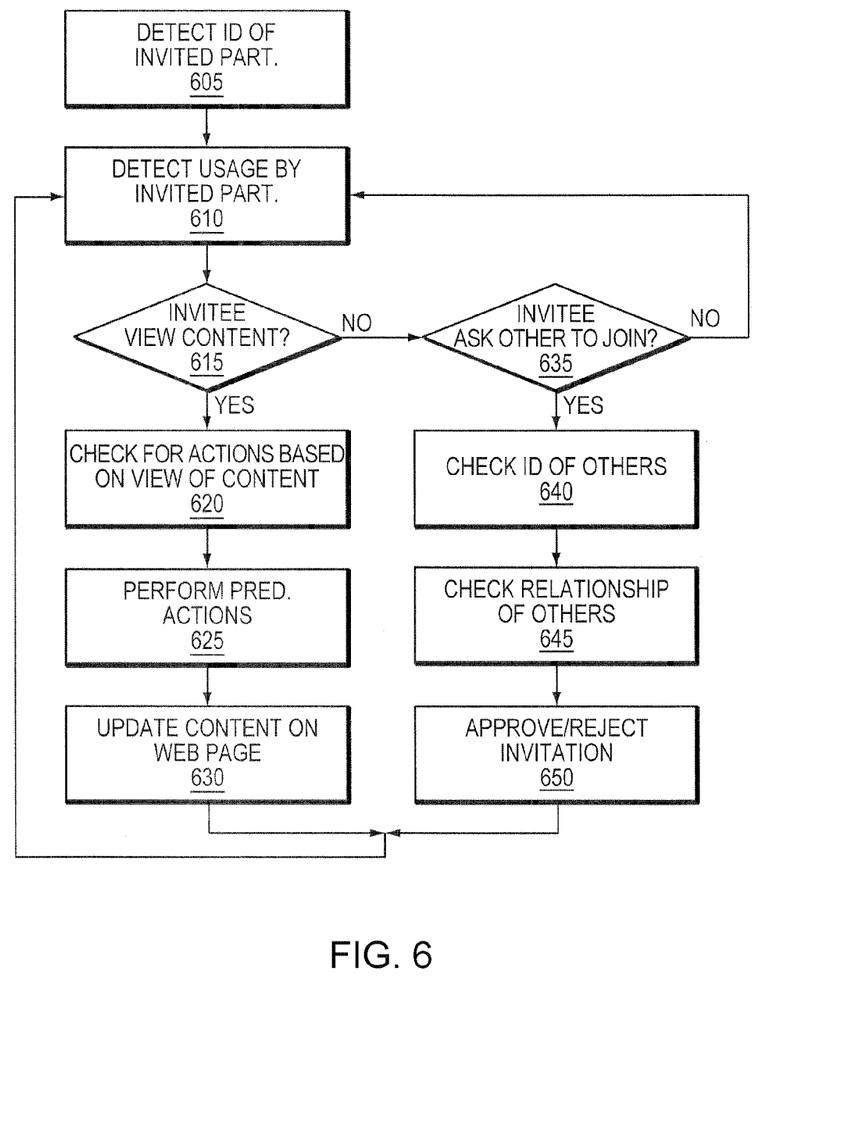
FIG. 6 is a flow diagram consistent with one embodiment of the methods and apparatuses for selectively displaying information to an invited participant.
Figure 7:
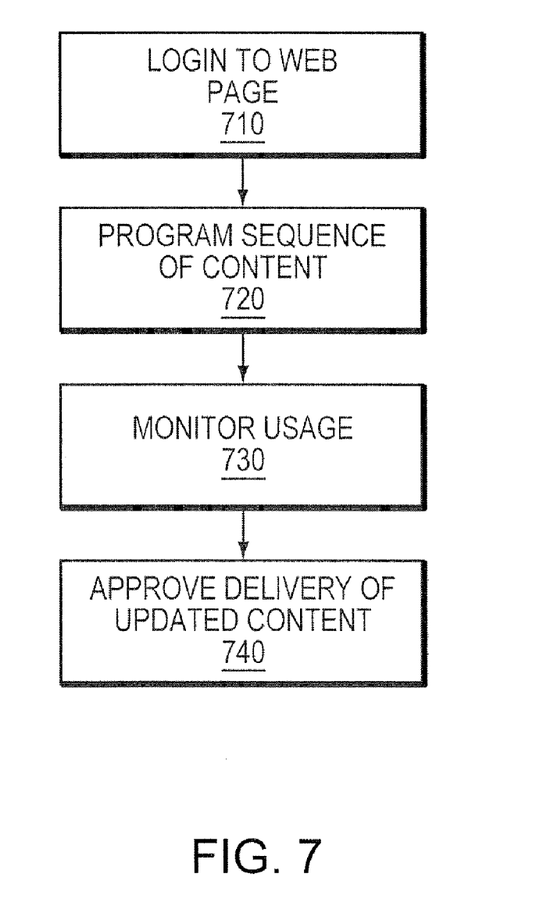
FIG. 7 is a flow diagram consistent with one embodiment of the methods and apparatuses for selectively displaying information to an invited participant.

The flow diagrams as depicted in FIGS. 6 and 7 are one embodiment of the methods and apparatuses for selectively displaying information to an invited participant. The blocks within the flow diagrams can be performed in a different sequence without departing from the spirit of the methods and apparatuses for selectively displaying information to an invited participant. Further, blocks can be deleted, added, or combined without departing from the spirit of the methods and apparatuses for selectively displaying information to an invited participant.

The flow diagram in FIG. 6 illustrates usage of an invited participant according to one embodiment of the invention.

In Block 605, the identity of the invited participant is detected. In one embodiment, the invited participant accesses the customized web page when the identity is detected. In another embodiment, the invited participant logs into the customized web page when the identity is detected.

In Block 610, usage by the invited participant is detected. In one embodiment, the customized web page tracks the usage of the content by the particular invited participant.

In Block 615, if the invited participant views the content on the customized web page, then a check is performed based on the content that is viewed by the invited participant in Block 620. For example, particular content that is viewed by the invited party may be programmed to trigger another action in one embodiment. Accordingly, a check is performed on whether this particular content is viewed by the invited participant that would trigger another action.

In Block 625, if the particular content is viewed as detected in the Block 620, then the predetermined action is performed. For example, the invited participant views content #1 on the customized web page. Based on viewing the content #1, content #2 is offered for use by the invited participant in this example. In this example, the predetermined action is supplying the invited participant with the content #2. In another embodiment, different predetermined actions include adding content, modifying content, deleting content, and the like.

In Block 630, the customized web page is updated to reflect any changes from the predetermined action performed in the Block 625.

If the invited participant does not view the content in the Block 615, invitation of other participants to join the customized web page is performed in Block 635.

If the invited participant does not invite other participants, the usage by the invited participant continues to be detected in the Block 610.

If the invited participant invites other participants to join the customized web page, the identity of the newly invited participants is checked in Block 640.

In Block 645, the relationships between the newly invited participants and the currently invited participant is determined. In one embodiment, the currently invited participant may identify the relationship between the currently invited participant and the newly invited participants, and the relationship between the newly invited participants. These relationships include a boss, a co-worker, a subordinate, a friend, a family member, and the like.

In Block 650, the host for the customized web page approves or rejects the inclusion of the newly invited participants. In another embodiment, the host pre-approves the newly invited participants based on the relationships as defined in the Block 645. For example, if the host pre-approves all newly invited participants that are "family" members, then if a family member is invited by the currently invited participant, then the newly invited participants are automatically includes as participants of the customized web page without further approval from the host. In yet another embodiment, the host may pre-approve all newly invited participant regardless of identity or relationship.

In one embodiment, the host is able to publicly communicate with the invited participants through the customized web page. Further, each of the invited participants is able to initiate communication with the host by way of a private channel such as via email, phone, or instant-messaging chat.

The flow diagram in FIG. 7 illustrates programming a customized web page to share content with participants according to one embodiment of the invention.

In Block 710, a host accesses the customized web page.

In Block 720, the host programs a sequence of content for the customized web page. For example, the host can instruct that content #1 to be displayed on the customized web page. Next, the host can instruct the display of content #2 to be displayed on the customized web page once the content #1 is viewed by one of the invited participants. In another example, the content #2 can be a modified version of the content #1.

In Block 730, the host can monitor the usage of the customized web page by the invited participants. In one embodiment, the host tracks content that is accessed by the individual invited participants.

In Block 740, the host approves delivery of updated content based on the usage of the invited participants. For example, the host is able to further customize the content for use by the invited participants via the customized web page based on additional usage data that is monitored by the host in the Block 730.

The foregoing descriptions of specific embodiments of the invention have been presented for purposes of illustration and description. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed:

1. A method comprising:
    allowing an invited participant to access a customized web page on an electronic device;
    programming a first content for the invited participant;
    displaying the first content on the customized web page to the invited participant via the electronic device;
    detecting usage of the first content by the invited participant to determine whether the invited participant has viewed the first content;
    automatically displaying a second content on the customized web page to the invited participant in response to the invited participant having viewed the first content on the customized web page; and
    issuing an invitation to an uninvited participant to access the customized web page in response to the invited participant having been determined to not have viewed the first content on the customized web page.

2. The method according to claim 1 wherein the first content and the second content include one of graphical, textual, and audio elements.

3. The method according to claim 1 further comprising detecting an identity of the invited participant.

4. The method according to claim 1 further comprising detecting a relationship of the uninvited participant to the invited participant.

5. The method according to claim 4 further comprising converting the uninvited participant into another invited participant based on the relationship.

6. The method according to claim 4 wherein the relationship is one of a co-worker, a colleague, a boss, a relative, and a friend.

7. The method according to claim 1 further comprising tracking usage by the invited participant.

8. The method according to claim 1 further comprising tracking invitations of uninvited participants.

9. A system, comprising:
    a processor; and
    a memory storing instructions that when executed by the processor implement,
        an invitee detection module configured to detect an invited participant utilizing a customized web page,
        a usage module configured to track content utilized by the invited participant,
        a content module configured to display first content on the customized web page to the invited participant and to automatically display a second content on the customized web page to the invited participant in response to a determination that the invited participant has utilized the first content on the customized web page; and
        the invitee detection module further configured to invite an uninvited participant to view the customized web page in response to a determination that the invited participant has not utilized the first content on the customized web page.

10. The system according to claim 9 further comprising a storage module configured to store an identity of the invited participant.

11. The system according to claim 9 wherein the content is one of a graphical, textual, and audio element.

12. The system according to claim 11 wherein the invitee detection module is configured to identify a relationship of the uninvited participant to the invited participant.

13. The system according to claim 12 wherein the invitee detection module is further configured to selectively allow the uninvited participant to access the customized web page based on the relationship.

14. A system comprising:
    means for allowing an invited participant to access a customized web page;
    means for programming a first content for the invited participant;
    means for displaying the first content on the customized web page to the invited participant;
    means for detecting usage of the first content by the invited participant to determine whether the invited participant has viewed the first content;
    means for automatically displaying a second content on the customized web page to the invited participant in response to the invited participant having viewed the first content on the customized web page; and
    means for issuing an invitation to an uninvited participant to access the customized web page in response to the invited participant having been determined to not have viewed the first content on the customized web page.

15. The method according to claim 1 wherein the customized web page includes a private chat channel through which a host of the customized web page communicates with the invited participant.

16. The method according to claim 4 wherein detecting the relationship further comprises:
    accessing a record associated with the invited participant, the record including one or more relationship fields that indicate other participants that have a relationship with the invited participant.

17. The method according to claim 1 wherein the invited participant is a participant in a collaboration session.

18. The system according to claim 14 further comprising:
    means for detecting a relationship between the uninvited participant and the invited participant; and
    means for approving the uninvited participant based on the relationship.

19. The system according to claim 14 wherein the customized web page includes a private chat channel through which a host of the customized web page communicates with the invited participant.

20. The system according to claim 14 wherein the invited participant is a participant in a collaboration session.

* * * * *